(12) United States Patent
Senda (10) Patent No.: US 9,499,226 B2
(45) Date of Patent: Nov. 22, 2016

(54) EXHAUST PIPE SIDE COVER FOR MOTORCYCLE

(71) Applicant: Kawasaki Jukogyo Kabushiki Kaisha, Kobe-shi, Hyogo (JP)

(72) Inventor: Atsushi Senda, Akashi (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 0 days.

(21) Appl. No.: 14/941,355

(22) Filed: Nov. 13, 2015

(65) Prior Publication Data

US 2016/0068217 A1 Mar. 10, 2016

Related U.S. Application Data

(63) Continuation of application No. PCT/JP2014/061416, filed on Apr. 23, 2014.

(30) Foreign Application Priority Data

May 22, 2013 (JP) .................................. 2013-107869

(51) Int. Cl.
*B62J 19/00* (2006.01)
*B62J 23/00* (2006.01)
(Continued)

(52) U.S. Cl.
CPC .............. *B62J 23/00* (2013.01); *F01N 13/082* (2013.01); *F01N 13/1855* (2013.01); *F01N 2590/04* (2013.01)

(58) Field of Classification Search
CPC .............................. B62J 23/00; F01N 13/1855
See application file for complete search history.

(56) References Cited

U.S. PATENT DOCUMENTS 7,409,824 B2 * 8/2008 Inaoka .................... F01N 13/18
180/218
7,946,380 B2 * 5/2011 Yamamoto .............. F01N 13/14
181/204

(Continued)

FOREIGN PATENT DOCUMENTS

JP 2000-087723 3/2000
JP 2005-105959 4/2005
(Continued)

OTHER PUBLICATIONS

English Translation of the International Preliminary Report on Patentability and Written Opinion of the International Searching Authority mailed Dec. 3, 2015 for International PCT Patent Application No. PCT/JP2014/061416, filed Apr. 23, 2014 (12 pages).

(Continued)

*Primary Examiner* — Kevin Hurley (57) ABSTRACT

An exhaust pipe side covering has a rear portion supported by a muffler or an exhaust pipe of an exhaust device and also has a front portion supported by a motorcycle body through a bracket, thereby covering the exhaust pipe from outside. A projecting piece projecting inwardly of a motorcycle widthwise direction is formed in an inner side surface of a front portion of a main body of the exhaust pipe side covering and a screw insertion hole is formed in the vicinity of a projecting piece in the main body. The bracket is formed with a plug-in hole, with which the projecting piece is engaged by plugging in, and a threaded hole. A mounting screw member is engaged in the threaded hole through the screw insertion hole. The section of the projecting piece transverse to a projecting direction thereof is of an elongated shape.

6 Claims, 7 Drawing Sheets

(51) Int. Cl.
  *F01N 13/08* (2010.01)
  *F01N 13/18* (2010.01)

(56) References Cited

U.S. PATENT DOCUMENTS

| | | | | |
|---|---|---|---|---|
| 8,602,158 B2* | 12/2013 | Hayama | | F01N 13/14 181/212 |
| 8,851,230 B2* | 10/2014 | Ono | | F01N 1/089 180/219 |
| 9,016,427 B2* | 4/2015 | Yazaki | | B62J 23/00 180/309 |
| 2009/0293466 A1* | 12/2009 | Dallas, Sr. | | F01N 13/082 60/324 |

FOREIGN PATENT DOCUMENTS

| | | |
|---|---|---|
| JP | 2011-173461 | 9/2011 |
| JP | 2011-255868 | 12/2011 |
| JP | 2012-232627 | 11/2012 |

OTHER PUBLICATIONS

International Search Report for PCT/JP2014/061416, filed Apr. 23, 2014.

* cited by examiner

EXHAUST PIPE SIDE COVER FOR MOTORCYCLE

CROSS REFERENCE TO THE RELATED APPLICATION

This application is a continuation application, under 35 U.S.C. §111(a) of international application No. PCT/JP2014/061416, filed Apr. 23, 2014, which claims priority to Japanese patent application No. 2013-107869, filed May 22, 2013, the entire disclosure of which is herein incorporated by reference as a part of this application.

BACKGROUND OF THE INVENTION

1. Field of the Invention

The present invention relates to a side covering for covering an exhaust pipe in a motorcycle from laterally outwardly with respect to a motorcycle widthwise direction.

2. Description of Related Art

It is quite often that a decorative exhaust pipe side covering is employed to cover a portion or the entire length of an exhaust pipe, which extends below a combustion engine of the motorcycle, from a lateral outer side with respect to a motorcycle widthwise direction. In such case, when the exhaust pipe side covering referred to above is to be assembled onto a motorcycle body, the exhaust pipe side covering has to be slid in a vertical direction or longitudinal direction of the motorcycle body relative to a bracket on the motorcycle body side so as to allow a pawl of the exhaust pipe side covering to be engaged with the bracket. By so doing, a screw insertion hole in the exhaust pipe side covering is positioned to align with a threaded hole in the bracket on the motorcycle body side, and subsequently, the exhaust pipe covering is fixed to the bracket through fastening of bolts.

It is to be noted that as an installing structure for a muffler covering for covering a muffler, a structure similar to that described above is known (in this connection, see the patent documents 1 and 2 listed below), but in view of the difference in structure between the muffler and the exhaust pipe, the installing structure for the muffler cannot be applied to an installing structure for the exhaust pipe covering.

PRIOR ART LITERATURE

Patent Document 1: JP Laid-open Patent Publication No. 2000-087723
Patent Document 2: JP Laid-open Patent Publication No. 2005-105959

Since at the time of installation onto the motorcycle body the exhaust pipe covering is engaged with the bracket while having been slid in the vertical direction or the longitudinal direction of the motorcycle body relative to the bracket, the attendant worker requires watching to recognize the engaged condition from front or rear of the motorcycle body. Therefore, the workability to assemble the exhaust pipe covering from a leftward and rightward side of the motorcycle body is not good. Also, a positioning work to align the screw insertion hole with the threaded hole by engaging the exhaust pipe covering with the bracket is complicated.

SUMMARY OF THE INVENTION

In view of the foregoing, the present invention has been devised to provide an exhaust pipe side covering for a motorcycle, in which the workability in assemblage is improved.

In order to accomplish the foregoing object, an exhaust pipe side covering for a motorcycle in accordance with the present invention which includes a rear portion supported by a muffler or an exhaust pipe of an exhaust device and a front portion supported by a vehicle body through a bracket. The exhaust pipe side covering include a main body configured to cover the exhaust pipe from outside and a projecting piece formed in an inner side surface of the front portion of the main body and protruding inwardly with respect to a motorcycle widthwise direction. In such case, a screw insertion hole is formed in the vicinity of a portion of the main body adjacent the projecting piece; a plug-in hole, in which the projecting piece is engaged by means of plug-in, and a threaded hole are formed in the bracket; and a mounting screw member is engaged in the threaded hole through the screw insertion hole. The projecting piece is of a shape elongated in section perpendicular to a projecting direction thereof.

According to the present invention, merely by plugging into the plug-in hole in the bracket the projecting piece protruding from the inner side surface of the main body, the main body is engaged with the bracket in a condition with the screw insertion hole in the main body positioned to align with the threaded hole in the bracket. Accordingly, as is the case with the conventional covering mounting structure, a work to slide the exhaust pipe side covering in a vertical direction or longitudinal direction of the motorcycle body is no longer required, and therefore, the exhaust pipe side covering can be easily and quickly engaged with the bracket by means of a screw through a work from an outer side in the motorcycle widthwise direction. Also, since the projecting piece is of a shape elongated in section perpendicular to the projecting direction, the main body is engaged with the bracket in a condition, in which the exhaust pipe side covering is refrained from rotating, by plugging the projecting piece into the plug-in hole. Therefore, alignment of the screw insertion hole in the exhaust pipe side covering with the threaded hole is easy to achieve. As a result, a workability of the exhaust pipe side covering onto the exhaust pipe improved.

In a preferred embodiment of the present invention, the projecting piece may be formed in an upper portion of the main body. According to the structural feature, the projecting piece is viewed and confirmed from above and, hence, a work of plugging the projecting piece in the plug-in hole is eased.

In another preferred embodiment of the present invention, the screw insertion hole referred to above may be formed in an upper half portion of the main body and oriented diagonally upwards and outwards in the motorcycle widthwise direction. This structural feature allows the insertion and fastening of the screw member while the screw insertion hole is viewed from diagonally above and, therefore, the fastening workability of the screw member improves.

In a further preferred embodiment of the present invention, the main body may extend in a longitudinal direction of the motorcycle and includes an intermediate portion in the longitudinal direction formed with a bent portion that protrudes towards a rear end portion outwards in the motorcycle widthwise direction, in which case the screw insertion hole is formed in the vicinity of the bent portion. The bent portion of the main body is susceptible to a considerable flexure. However, by fixing the main body to the bracket through the screw insertion hole formed in the vicinity of this bent portion, the occurrence of the flexure can be effectively suppressed as compared with the case in which a site on a front side or a rear side that is distant from the bent portion is fixed to the main body. It is, however, to be noted that the intermediate portion in the forward and rearward direction referred to above means a region within ⅓ to ⅔ of the total length of the main body from a front end of the main body.

In a still further preferred embodiment of the present invention, the projecting piece may be engaged in the plug-in hole through a grommet made of an elastic material. According to this feature, the exhaust pipe side covering is refrained from vibrating relative to the bracket. Also, when the projecting piece is plugged into the plug-in hole, the projecting piece extends through the plug-in hole while elastically deforming the grommet. Therefore, the projecting piece is engaged in the plug-in hole by the effect of the restoring force resulting from the elastic deformation of the grommet. Accordingly, the projecting piece when merely plugged in, is easily engaged in the plug-in hole.

Where the projecting piece is engaged in the plug-in hole through the grommet as discussed above, an engagement pawl may be provided in a projecting end portion of the projecting piece such that the engagement pawl being engaged with an inner side end portion of the grommet to prevent the projecting piece from detaching. According to this feature, after the projecting piece extends through the plug-in hole while elastically deforming the grommet, the engagement pawl of the projecting end portion of the projecting piece then breaking out from the grommet comes to contact the inner side end portion of the grommet then restoring to the original shape after the elastic deformation. Accordingly, merely by inserting the projecting piece into the grommet to extend therethrough, the projecting piece can be refrained from rotating.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter a preferred embodiment of the present invention will be described in detail with particular reference to the accompanying drawings. In describing the present invention the term "left and right" used hereinabove and hereinafter are to be understood as relative terms description of positions and/or direction as viewed from a motorcycle rider occupying the seat during the forward travel of the motorcycle.

Figure 1:
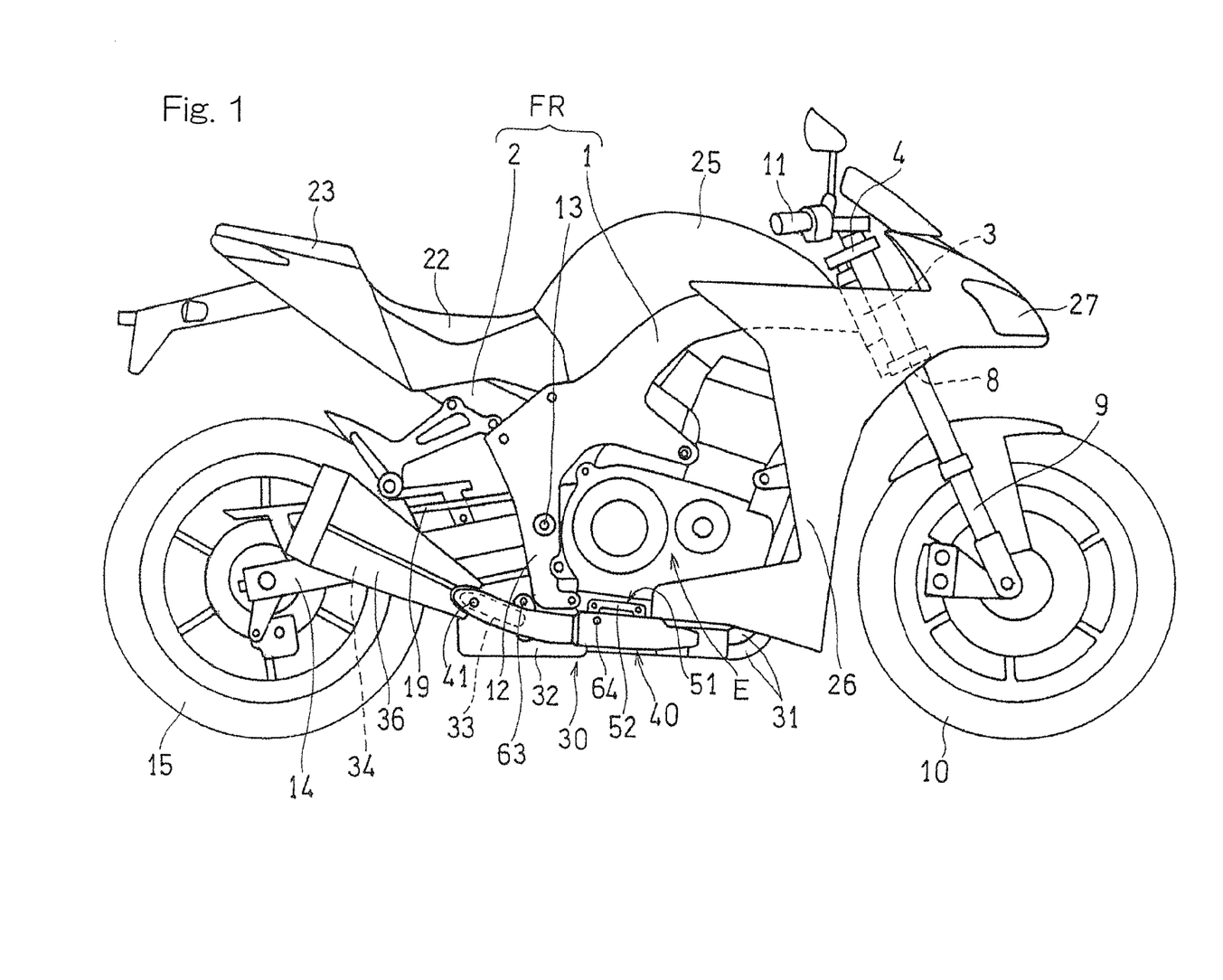
FIG. 1 is a schematic side view showing a motorcycle equipped with an exhaust pipe side covering designed in accordance with a preferred embodiment of the present invention.

FIG. 1 illustrates a schematic side view of a motorcycle equipped with an exhaust pipe side covering 40 designed in accordance with the preferred embodiment of the present invention. The motorcycle includes a motorcycle frame structure FR made up of a main frame 1, forming a front half portion thereof, and a rear frame 2 connected with a rear portion of the main frame 1 and forming a rear half portion thereof. The main frame 1 has a front end portion to which a head pipe 3 is fitted, and an upper bracket 4 and an under bracket 8 are fitted to a steering shaft (not shown) that is rotatably inserted in the head pipe 3. A front fork 9 is supported by the upper bracket 4 and the under bracket 8, and a front wheel 10 is supported by a lower end portion of the front fork 9. A handlebar 11 is fitted to the upper bracket 4 at an upper end portion of the front fork 9.

The main frame 1 also has a rear end lower portion provided with a swingarm bracket 12, and a swingarm 14 is supported by the swingarm bracket 12 through a pivot pin 13 at a front end portion for movement up and down about such pivot pin 13. A rear wheel 15 is supported by a rear end portion of the swingarm 14. A motorcycle combustion engine E is supported by a lower portion of the main frame 1, and the combustion engine E drives the rear wheel 15 through a power transmission mechanism 19 such as, for example, a substantially endless drive chain. The combustion engine E is, for example, a parallel multi-cylinder, four stroke combustion engine.

A rider's seat 22 and a fellow passenger's seat 23 are supported by the rear frame 2, and a fuel tank 25 is fitted to an upper portion of the main frame 1, that is, to a motorcycle body upper portion and between the handlebar 11 and the rider's seat 22. Also, a fairing 26, which is made of a resinous material, is mounted on the motorcycle body front portion. The fairing 26 is large enough to cover a region ranging from forwardly of the handlebar 11 to a lateral side of the motorcycle body front portion and is referred to as a full cowl. A headlamp unit 27 is mounted on the fairing 26.

Exhaust gases from the combustion engine E are discharged by an exhaust device 30 rearwardly from a right side rear portion of the motorcycle body. In other words, exhaust gases from the combustion engine E flow in an exhaust pipe 31, which extends rearwardly via forward and downward, and then, are introduced into a silencer box 32 where they are silenced. Thereafter, the exhaust gases flow, via a connecting tube 33, into a muffler 34 on a right side of the rear wheel 15, where they are again silenced, before they are discharged from the muffler 34 to the outside. The muffler 34 is covered from outside by a muffler covering 36. A portion of the exhaust device 30 is covered by an exhaust pipe side covering 40 from lateral outside with respect to the motorcycle widthwise direction.

Figure 2:
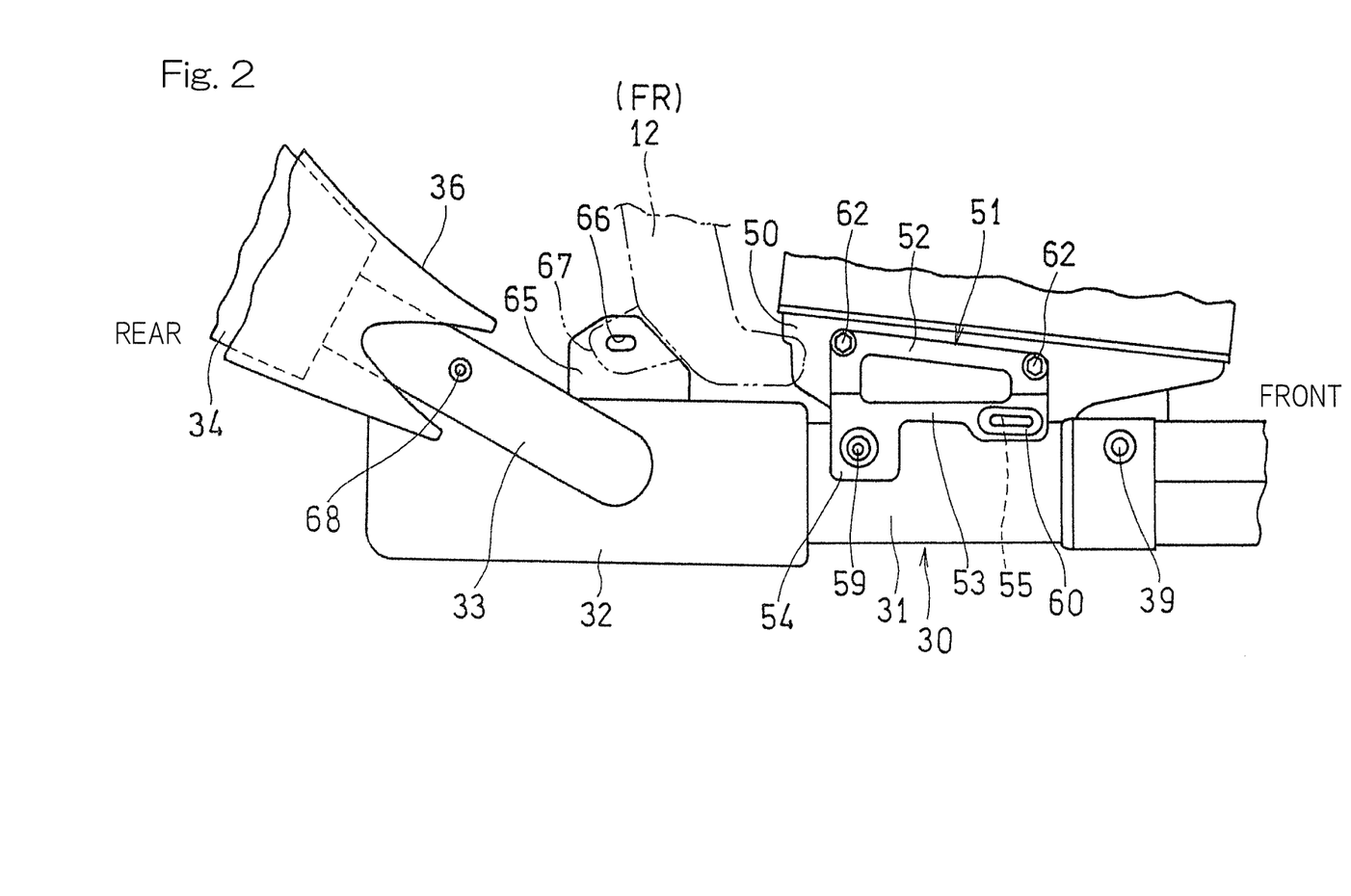
FIG. 2 is a schematic side view showing an exhaust device of the motorcycle and a bracket before the exhaust pipe side covering is fitted.
Figure 3:
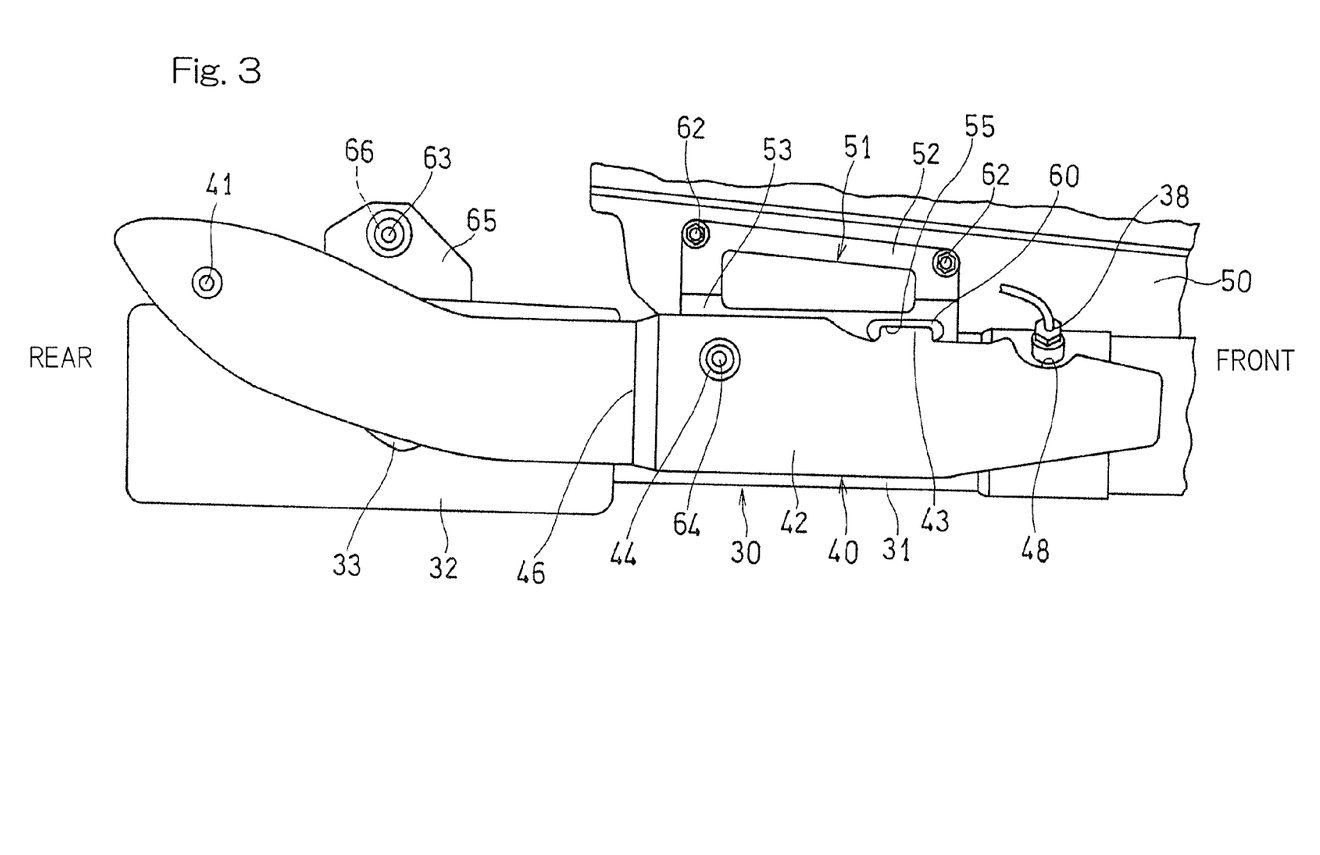
FIG. 3 is a schematic side view showing the exhaust device of FIG. 2 in which the exhaust pipe side covering has been fitted.

FIG. 2 illustrates the exhaust device 30 in a condition before the exhaust pipe side covering 40 is fitted thereto. As shown in FIG. 2, the silencer box 32 of the exhaust device 30 is, when a screw member 63 (shown in FIG. 1) is threaded into a threaded hole of a mounting bracket 67 provided in the swingarm bracket 12 through a screw insertion hole 66 in a mounting piece 65 provided in the silencer box 32, supported by the motorcycle body. An oil pan 50 provided in a lower portion of the combustion engine E is provided with a bracket 51 for supporting the exhaust pipe side covering 40, which bracket 51 is fitted to the oil pan 50 by fastening the screw member 62 such as, for example, a bolt. At a position forwardly of the oil pan 50, a threaded hole 39 for fitting an oxygen sensor 38 (shown in FIG. 3) to the exhaust pipe 31.

As shown in FIG. 1, a rear portion of the exhaust pipe side covering 40 is supported by a screw member 41 such as, for example, a bolt being fastened into a threaded hole 68 (shown in FIG. 2) provided in the connecting tube 33 Also, a front portion of the exhaust pipe side covering 40 is supported by the oil pan 50 through the bracket 51, thereby covering the exhaust pipe 31 from an outer side in the motorcycle widthwise direction. The oil pan 50 referred to above is a part of the combustion engine E that is supported by the main frame 1, and therefore, the front portion of the exhaust pipe side covering 40 is supported by the motorcycle frame structure FR through the bracket 51. The details of the exhaust pipe side covering 40 will be discussed later. It is to be noted that although in describing this preferred embodiment the rear portion of the exhaust pipe side covering 40 has been shown and described as supported by the connecting tube 33, such a structure can be employed in which the rear portion of the exhaust pipe side covering 40 is supported by the muffler 34 or a muffler covering 36.

Figure 4:
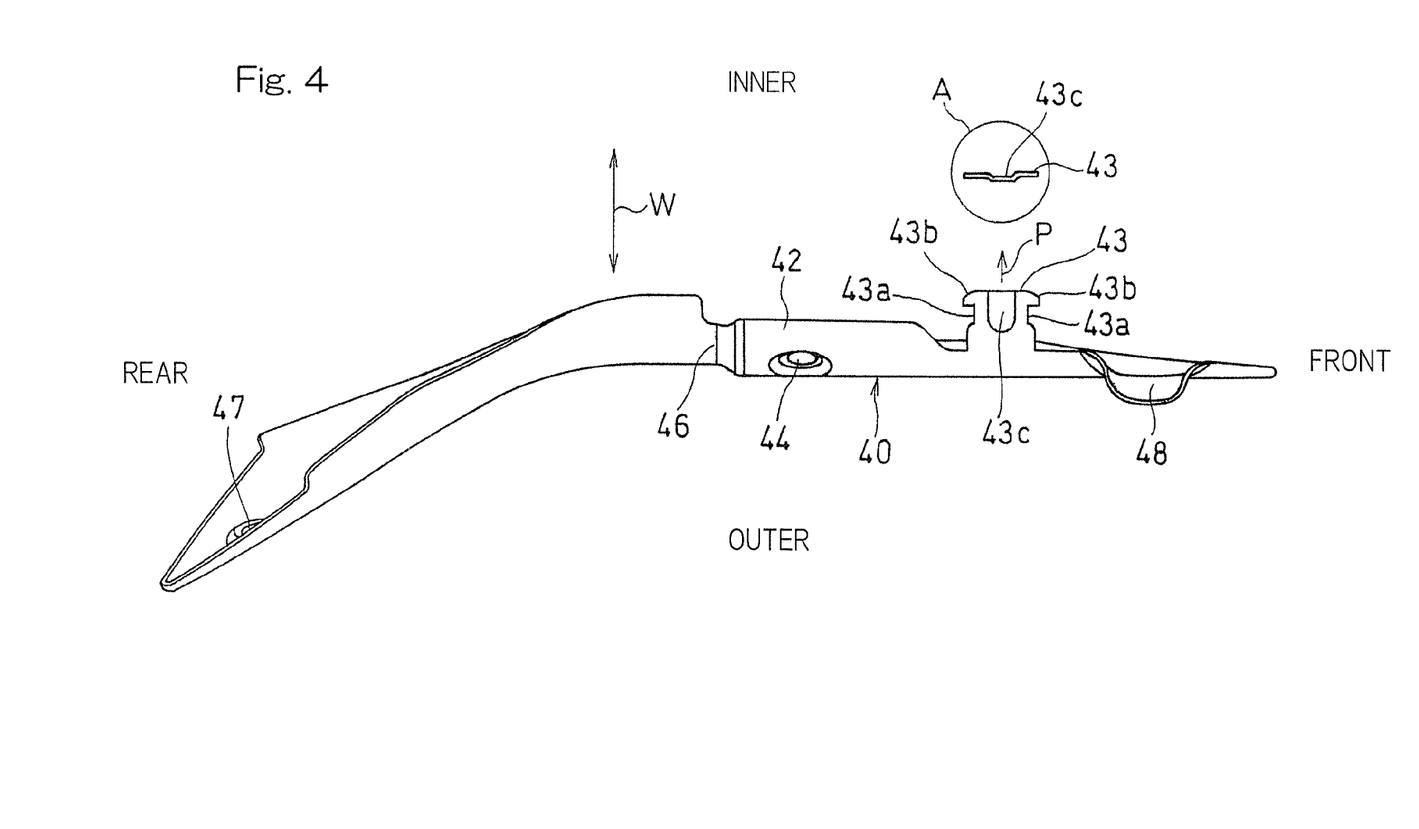
FIG. 4 is a schematic top plan view showing the exhaust pipe side covering as viewed from top.

FIG. 4 illustrates a schematic top plan view showing the exhaust pipe side covering 40 as viewed from above. The exhaust pipe side covering 40 includes a main body 42 of such a substantially sectional shape, in which a longitudinally elongated flat metal sheet has been substantially semi-spherically curled, and a projecting piece 43 protruding from an inner side face of a front portion of this main body 42 in a direction inwardly of the motorcycle widthwise direction W. The main body 42 covers the exhaust pipe 31 and the connecting tube 33, both shown in FIG. 2, from the outside. The main body 42 is formed with a screw insertion hole 44 in the vicinity of a portion thereof rearwardly of the projecting piece 43 shown in FIG. 4. As clearly shown in FIG. 6, the insertion hole 44 is oriented in an upper half portion of the main body 42 in a direction diagonally upwardly and outwards in the motorcycle widthwise direction.

An intermediate portion of the main body 42 with respect to a forward and rearward direction or longitudinal direction of the motorcycle is formed with a bent portion 46 which is curved outwardly of the motorcycle widthwise direction W towards a rear end portion thereof. A portion of the main body 42 on one side of the bent portion 46 adjacent the rear thereof covers from outside the connecting tube 33 which connects between the silencer box 32, shown in FIG. 2, and the muffler 34 positioned diagonally rearwardly and outside of the silencer box 32. The screw insertion hole 44 shown in FIG. 4 is disposed at a position in the vicinity of a forward side relative to the bent portion 46. The main body 42 is formed, at a position adjacent a rear end thereof, with a screw insertion hole 47 for threadingly fixing the main body 42 to the connecting tube 33 (best shown in FIG. 2), and is also formed, at a position in the vicinity of a front end thereof, with a recess 48 for allowing the oxygen sensor 38 (shown in FIG. 3) to protrude.

On the other hand, the projecting piece 43 of the exhaust pipe side covering 40 is of a structure in which a portion of the main body 42 of an elongated flat sheet member is bent to protrude towards an inner side with respect to the motorcycle widthwise direction W. The section of this projecting piece 43 taken in a direction perpendicular to a protruding direction P facing towards the inner side represents an elongated shape corresponding to the section of the sheet member, as shown in a fragmentary side view of the circle A depicted in FIG. 4. The projecting piece 43 represents a substantially rectangular shape when viewed from above. The projecting piece 43 is formed with an engagement groove 43a on front and rear sides. The projecting piece 43 is also formed with an engagement pawl 43 protruding in a lateral direction (in the forward and rearward direction in FIG. 4) relative to the projecting direction P. Also, the projecting piece 43 is formed, at an intermediate portion of the rectangular shape thereof, with a reinforcement swelling portion 43a slightly swelling upwards.

Figure 5:
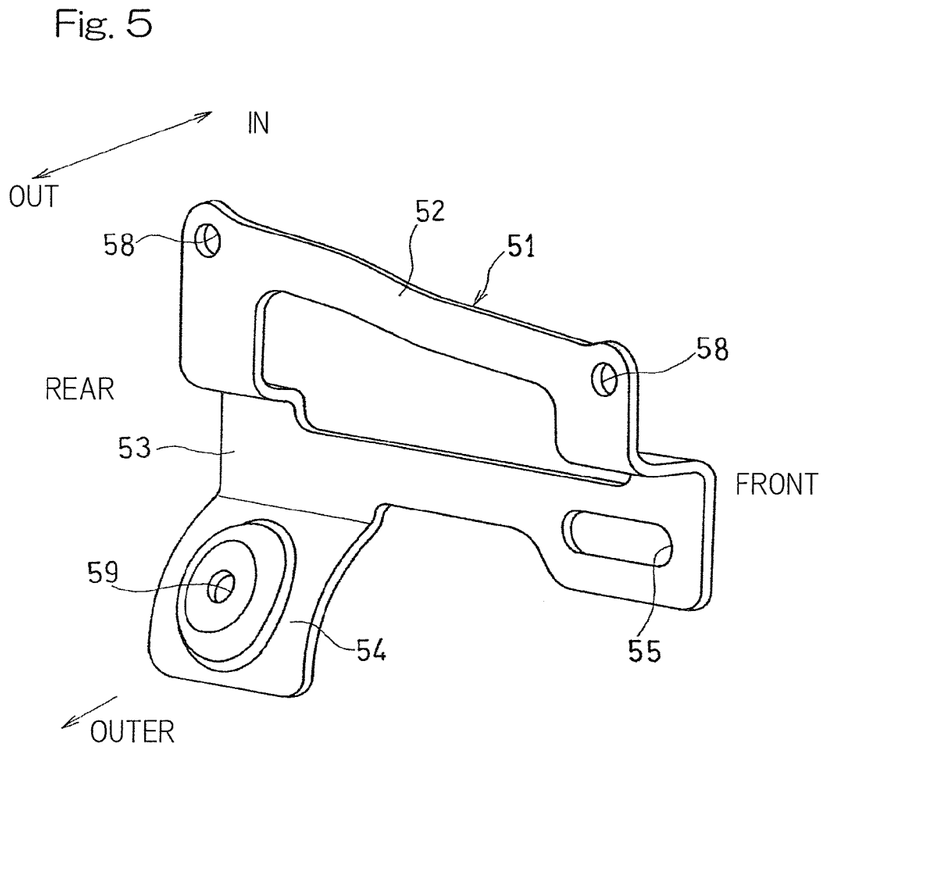
FIG. 5 is a perspective view showing the bracket.

The bracket 51 is used for supporting the front portion of the exhaust pipe side covering 40 by the oil pan 50, and is, as shown in FIG. 5, formed by press molding a single metal sheet member. The bracket 51 is formed integrally with a mounting piece 52 extending in a forward and rearward direction or longitudinal direction, an intermediate piece 53 extending in the forward and rearward direction at a location below the mounting piece 52 and an inner side of the mounting piece 52 with respect to the motorcycle widthwise direction, and a support piece 54 extending from a rear portion of the intermediate piece 53 downwardly and towards a lateral outer side while being curved.

Figure 6:
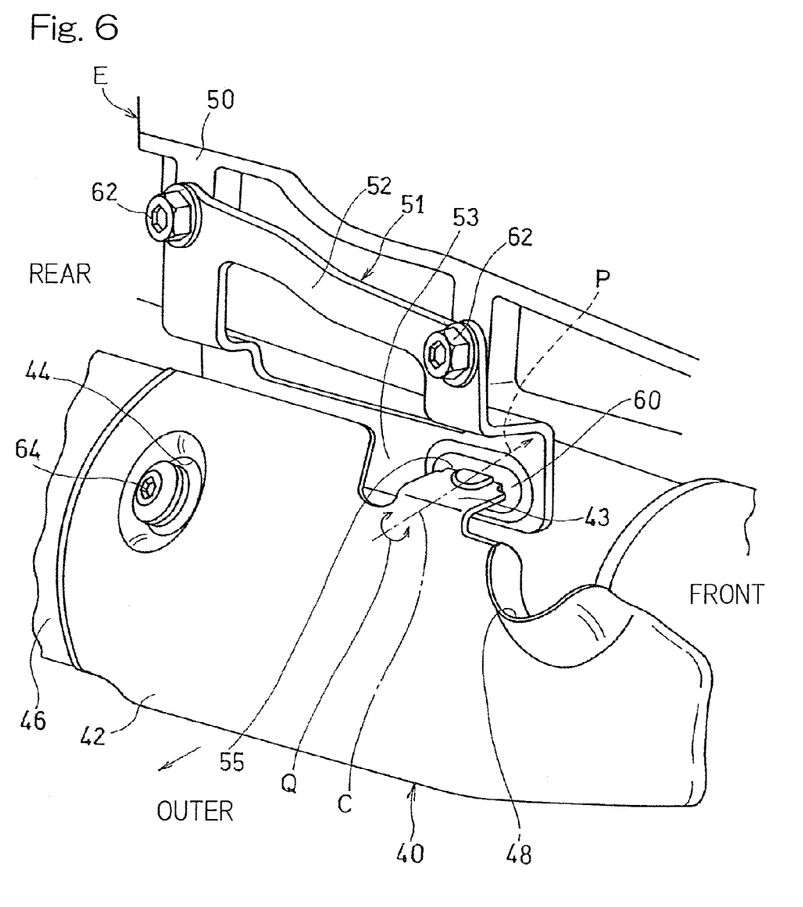
FIG. 6 is a perspective view showing an important portion of the exhaust pipe side covering in a fitted condition.

The support piece 54 is of a curved shape corresponding to the sectional shape of the main body 42 of the exhaust pipe side covering 40 shown in FIG. 4. At a location adjacent to a front end of the intermediate piece 53 shown in FIG. 5, there is provided a slot shaped plug-in hole 55 which is elongated in the forward and rearward direction. In this plug-in hole 55 the projecting piece 43 is plugged, as best shown in FIG. 6. The plug-in hole 55 is so shaped as to be larger than the elongated sectional shape of the projecting piece 43 by a quantity corresponding to a grommet as will be discussed later. Two screw insertion holes 58 through which the screw members 62 (best shown in FIG. 2) for mounting the bracket 51 onto the oil pan 50 are inserted, are provided in the mounting piece 52. The support piece 54 is provided with a threaded hole 59 by means of a weld nut as will be described later. The interval between the threaded hole 59 and the plug-in hole 55 is so chosen to be a value that coincides with the interval between the projecting piece 43 and the screw insertion hole 44 in the exhaust pipe side covering 40 shown in FIG. 6.

As shown in FIG. 2, in the bracket 51 a grommet 60 made of an elastic material such as, for example, rubber is engaged in the plug-in hole 55. As shown in FIG. 6, the projecting piece 43 of the exhaust pipe side covering 40 is plugged in the plug-in hole 55 in the bracket 51 through the grommet 60. By so doing, the projecting piece 43 is engaged in the plug-in hole 55, whereby the projecting piece 43 can be positioned at a predetermined position relative to the bracket 51. In other words, since the interval between the threaded hole 59 (best shown in FIG. 5) in the bracket 51 and the plug-in hole 55 is so set as to coincide with the interval between the screw insertion hole 44 in the exhaust pipe side covering 40 and the projecting piece 43, the insertion hole 44 is positioned so as to align with the threaded hole 59 (shown in FIG. 5) at the moment the projecting piece 43 is engaged in the plug-in hole 55.

Figure 7:
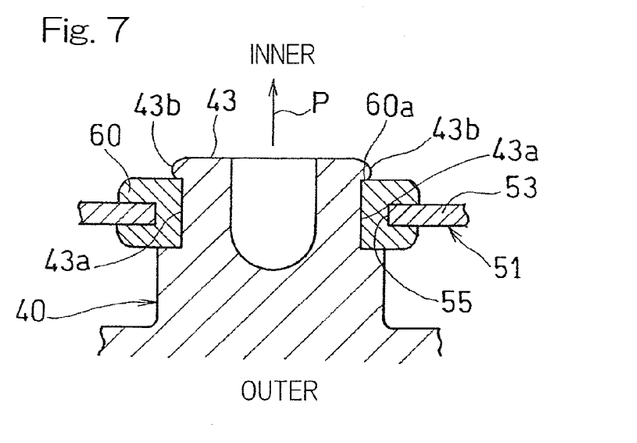
FIG. 7 is a schematic side sectional view showing an engaged portion at which a projecting piece in the exhaust pipe side covering and the bracket are engaged together.

Referring now to FIG. 7, when the projecting piece 43 is engaged in the plug-in hole 55, an engagement pawl 43b of a projecting end portion of the projecting piece 43 ingresses into a hollow portion of the grommet 60 while elastically deforming the grommet 60 so as to expand the diameter of the grommet 60. Then, when the engagement pawl 43b sneaks out from the grommet 60, the grommet 60 which has been elastically restored is brought into engagement into the engagement groove 43a of the projecting piece 43 and, at the same time, an inner side end portion 60a of the grommet 60 is brought into contact with and is hence engaged with an edge portion of the engagement pawl 43b of the projecting piece 43 to thereby establish a detent condition. Accordingly, the exhaust pipe side covering 40 is positioned so as to allow the screw insertion hole 44 thereof (shown in FIG. 6) to align with the threaded hole 59 in the bracket 31 (shown in FIG. 5) when the projecting piece 43 is merely plugged into the plug-in hole 55 through the grommet 60.

As clearly shown by the circle A in FIG. 4, the projecting piece 43 has a shape in which the section thereof perpendicular to the projecting direction P is elongated, and therefore, rotation, as indicated by Q, of the exhaust pipe side covering 40 about a center line C that is aligned in the projecting direction P of the projecting piece 43 as shown in FIG. 6 is suppressed effectively. In other words, the rotation of the exhaust pipe side covering 40 is halted. Accordingly, the posture of the exhaust pipe side covering 40 is accurately determined and, therefore, the two screw insertion holes 44 and 47 shown in FIG. 4 are accurately brought into alignment with the threaded hole 59 in the bracket 51 shown in FIG. 5 and the threaded hole 68 in the connecting tube 33 shown in FIG. 2.

Also, as clearly shown in FIG. 6, in view of the fact that the projecting piece 43 is formed of a flat plate member, the section perpendicular to the projecting direction represents an elongated shape and, this projecting piece 43 is plugged into the plug-in hole 55. Accordingly, the projecting piece 43 is supported by the bracket 51 in a condition in which the main body 42 of the exhaust pipe side covering 40 is refrained from rotating.

Figure 8:
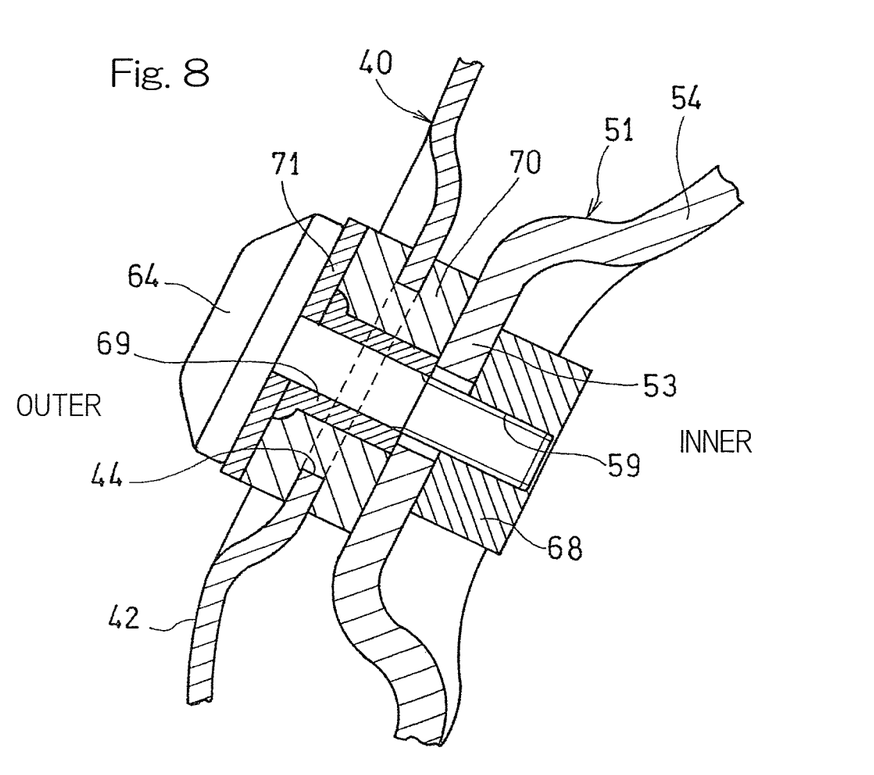
FIG. 8 is a schematic side sectional view showing a threaded joint between the exhaust pipe side covering and the bracket.

As shown in FIG. 8, the threaded hole 59 in the bracket 51 is formed by the weld nut 68 fixed to an inner surface of the support piece 54 of the bracket 51. In the screw insertion hole 44 of the exhaust pipe side covering 40 is inserted a grommet 70 of a kind having a collar 69 embedded therein, and the screw member 64 is engaged in the threaded hole 59 after having been inserted through the collar 69 with a washer 71 interposed underhead. Since as described above the projecting piece 43 is supported by the bracket 51 with the main body 42 held in the detent condition, the screw insertion hole 44 in the main body 42 of the exhaust pipe side covering 40 and the threaded hole 50 in the bracket 51 are accurately aligned with each other and, therefore, a work to fit the exhaust pipe side covering 40 to the bracket 51 by means of the screw member 64 can be facilitated.

In the construction hereinabove described, merely by inserting the projecting piece 43 of the exhaust pipe side covering 40 shown in FIG. 6 into the plug-in hole 55, positioning is accomplished in that the screw insertion hole 44 in the main body 42 is aligned with the threaded hole 59, shown in FIG. 5, in the bracket 51. Therefore, a work to slide in the vertical direction or longitudinal direction of the motorcycle body such as required with the conventional covering mount structure is no longer needed. As a result, merely by a work from the outer side with respect to the motorcycle widthwise direction, the main body 42 can be easily and quickly assembled with the bracket 51. Also, since the projecting piece 43 is of the elongated shape in section perpendicular to the projecting direction P, plugging in the protruding piece 43 into the plug-in hole 55 makes it possible to refrain the main body 42 from rotating relative to the bracket 51. Therefore, the insertion hole 44 in the exhaust pipe side covering 40 is automatically aligned with the threaded hole 59 (best shown in FIG. 5) in the bracket 51. As a result, the assembling work of the exhaust pipe side covering 40 is improved.

Since as clearly shown in FIG. 4 the projecting piece 43 is formed in the upper portion of the main body 42, the work to plug in the projecting piece 43 into the plug-in hole 55 in the bracket 51 can be accomplished while the projecting piece 43 is viewed and confirmed from above. Therefore, the plug-in work of the projecting piece 43 can be easily, quickly and accurately accomplished. Moreover, since as shown in FIG. 6, the screw insertion hole 44 is formed in an upper half portion of the main body 42 and is oriented diagonally upwardly and outside of the motorcycle widthwise direction W, the screw member 64 can be inserted into and fastened to the screw insertion hole 44 while the screw member 64 is viewed from above. Therefore, the fastening work of the screw member 64 is improved.

Also, the bent portion 46 bent in such a direction as to protrude outwardly of the motorcycle widthwise direction W towards the rear end portion is formed in the intermediate portion of the main body 42, which extends in the forward and rearward direction as shown in FIG. 4, and the screw insertion hole 44 is formed in the vicinity of this bent portion 46. Although the bent portion 46 in the main body 42 is susceptible to flexure, fixing of the main body 42 to the bracket 51 shown in FIG. 3 through the screw insertion hole 44 formed in the vicinity of the bent portion 46 is effective to suppress the occurrence of the flexure of the main body 42, as compared with the case in which such fixing takes place at a front or rear location distant from the bent portion 46 in the main body 42.

Moreover, since the projecting piece 43 shown in FIG. 6 is engaged in the plug-in hole 55 through the grommet 60 made of the elastic material, the exhaust pipe side covering 40 is vibration-insulated from the combustion engine E. Also, when the projecting piece 43 is plugged in the plug-in hole 55, the projecting piece 43 passes through the grommet 60 while causing an elastic deformation of the grommet 60. Therefore, by the restoring force after the elastic deformation of the grommet 60 the projecting piece 43 is engaged in the plug-in hole 55. Accordingly, merely by plugging the projecting piece 43, it is possible for the projecting piece 43 to be engaged in the plug-in hole 55.

In addition, as shown in FIG. 7 the engagement pawl 43b of the projecting end portion of the projecting piece 43 is engaged with the inner side end portion 60a of the grommet 60 to prevent the projecting piece 43 from detaching. Therefore, the main body 42 of the exhaust pipe side covering 40 can be engaged with the bracket 51 merely by means of a simple work to insert the projecting piece 43 into and through the grommet 60.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

30 . . . Exhaust device
31 . . . Exhaust pipe
34 . . . Muffler
40 . . . Exhaust pipe side covering
42 . . . Main body
43 . . . Projecting piece
43b . . . Engagement pawl
44 . . . Screw insertion hole
46 . . . Bent portion
51 . . . Bracket
55 . . . Plug-in hole
59 . . . Threaded hole
60 . . . Grommet
64 . . . Screw member
P . . . Protruding direction
W . . . Motorcycle widthwise direction

What is claimed is:

1. An exhaust pipe side covering for a motorcycle, which includes a rear portion supported by a muffler or an exhaust pipe of an exhaust device and a front portion supported by a motorcycle frame structure through a bracket, which exhaust pipe side covering comprises:
 a main body configured to cover the exhaust pipe from outside; and
 a projecting piece formed in an inner side surface of the front portion of the main body and protruding inwardly with respect to a motorcycle widthwise direction, wherein:
 a screw insertion hole is formed in the vicinity of a portion of the main body adjacent the projecting piece;
 a plug-in hole, in which the projecting piece is engaged by means of plug-in, and a threaded hole are formed in the bracket;
 a mounting screw member is engaged in the threaded hole through the screw insertion hole; and
 the projecting piece is of a shape elongated in section perpendicular to a projecting direction.

2. The exhaust pipe side covering for the motorcycle as claimed in claim 1, in which the projecting piece is formed in an upper portion of the main body.

3. The exhaust pipe side covering for the motorcycle as claimed in claim 1, in which the screw insertion hole is formed in an upper half portion of the main body and oriented diagonally upwards and outwards in the motorcycle widthwise direction.

4. The exhaust pipe side covering for the motorcycle as claimed in claim 1, in which the main body extends in a longitudinal direction of the motorcycle, and includes an intermediate portion in the longitudinal direction formed with a bent portion that protrudes towards a rear end portion outwards in the motorcycle widthwise direction; and
 the screw insertion hole is formed in the vicinity of the bent portion.

5. The exhaust pipe side covering for the motorcycle as claimed in claim 1, in which the projecting piece is engaged in the plug-in hole through a grommet made of an elastic material.

6. The exhaust pipe side covering for the motorcycle as claimed in claim 5, in which an engagement pawl is provided in a projecting end portion of the projecting piece, the engagement pawl being engaged with an inner side end portion of the grommet to prevent the projecting piece from detaching.

* * * * *